(12) United States Patent
Lansing et al.

(10) Patent No.: US 12,149,535 B2
(45) Date of Patent: Nov. 19, 2024

(54) CROSS-PLATFORM COLLABORATION SYSTEMS

(71) Applicant: Box, Inc., Redwood City, CA (US)

(72) Inventors: Derrik Randal Lansing, North Ogden, UT (US); Sachin Chopra, San Francisco, CA (US); Rohit Bakshi, Campbell, CA (US); Daniel Wayne Morkovine, San Carlos, CA (US); Faizan N. Buzdar, Redwood City, CA (US); Prachi Subhash Jadhav, Emerald Hills, CA (US); Yufeng Wu, Redwood City, CA (US); Yangxinye Yang, Redwood City, CA (US); Guojing Luo, San Francisco, CA (US); Drew Parker, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 265 days.

(21) Appl. No.: 16/948,838

(22) Filed: Oct. 1, 2020

(65) Prior Publication Data
US 2021/0105280 A1 Apr. 8, 2021

Related U.S. Application Data

(60) Provisional application No. 62/706,864, filed on Sep. 14, 2020, provisional application No. 62/909,680, filed on Oct. 2, 2019.

(51) Int. Cl.
*H04L 9/40* (2022.01)
*G06F 9/54* (2006.01)

(52) U.S. Cl.
CPC ............ *H04L 63/104* (2013.01); *G06F 9/543* (2013.01)

(58) Field of Classification Search
CPC ...................................................... H04L 63/104
See application file for complete search history.

(56) References Cited

U.S. PATENT DOCUMENTS

2006/0286536 A1* 12/2006 Mohler .................... G09B 5/00
434/350
2015/0033327 A1* 1/2015 Naglost ............... H04L 63/0807
726/19

(Continued)

OTHER PUBLICATIONS

"How to connect OneDrive + Slack," Zapier, date found via internet archive as Oct. 20, 2020, URL: https://zapier.com/apps/onedrive/integrations/slack.

(Continued)

*Primary Examiner* — Sherrod L Keaton
(74) *Attorney, Agent, or Firm* — Vista IP Law Group, LLP

(57) ABSTRACT

Internet communications between a content management system that stores a plurality of content objects and a third-party system is established. A hierarchy at the third-party system is determined, and a file and folder content object hierarchy at the content management system is generated based on the determined hierarchy at the third-party system. Users of the content management system and users of the third-party system are reconciled by comparing attributes of users of the third-party system with attributes of users of the content management system. Permissions pertaining to user accessed to content objects at the content management system are reconciled with permissions of the third-party system. Reconciled access permissions are applied to content objects of the generated hierarchy at the content management system. Some of the access permissions that are applied to the content object hierarchy of the content management system are more restrictive than the permissions of the third-party system.

20 Claims, 12 Drawing Sheets

(56) References Cited

U.S. PATENT DOCUMENTS

2018/0189343 A1* 7/2018 Embiricos ........... G06F 16/2358
2018/0349408 A1* 12/2018 Jewell ................. G06F 16/1734

OTHER PUBLICATIONS

"Box and Slack integrations and automations," Workato, date found via Google as Feb. 18, 2015, URL: https://www.workato.com/integrations/box+slack.

"Box file posts to Channel," Workato, dated Apr. 30, 2021, URL: https://app.workato.com/recipes/97648-box-file-posts-to-channel.

Koh, R., "Recipe 2: New Medical Document will sync to Salesforce and solicit approval from Agent via Slack," Workato, dated Oct. 5, 2017, URL: https://app.workato.com/recipes/472063-recipe-2-new-medical-document-will-sync-to-salesforce-and-solicit-approval-from-agent-via-slack.

Koh, R., "Recipe 3: Approval process for medical documents in Box," Workato, dated Aug. 22, 2019, URL: https://app.workato.com/recipes/472650-recipe-3-approval-process-for-medical-documents-in-box.

\* cited by examiner

CROSS-PLATFORM COLLABORATION SYSTEMS

RELATED APPLICATIONS

The present application claims the benefit of priority to U.S. Provisional Patent Application Ser. No. 62/706,864 titled "CROSS-PLATFORM COLLABORATION SYSTEMS", filed on Sep. 14, 2020, which is hereby incorporated by reference in its entirety; and the present application claims the benefit of priority to U.S. Provisional Patent Application Ser. No. 62/909,680 titled "INTER-APPLICATION WORKFLOW", filed on Oct. 2, 2019, which is hereby incorporated by reference in its entirety.

TECHNICAL FIELD

This disclosure relates to collaboration systems, and more particularly to techniques for cross-platform collaboration systems.

BACKGROUND

Content management systems (CMS systems) have become popularized. The sharing and collaboration features of such CMS systems have greatly enhanced how humans work together. The popularization of various sharing models has been so pervasive that a given enterprise might now have many millions of files that are shared by hundreds or thousands of people. The enterprise can establish policies, permissions, and rules that implement controlled sharing such that sharing can take place between people who are within the enterprise as well as with people who are external to the enterprise.

Concurrently, third-party systems comprising virtual meeting applications, messaging applications and/or other collaboration applications have not only gained widespread popularity but also have become feature-rich, at least to the extent that now, users will often use a first part of their screen or screens to display files and folders of the CMS and a second part of their screen or screens to display a user interface of the virtual meeting applications, messaging applications or other collaboration applications. Strictly as an example, a user might have a file/folder viewer window (e.g., a Finder or Explorer) on a left side of his/her screen and a UI for a messaging application on the right side of his/her screen. Further, as events happen over the files/folders, the left side of the screen changes to reflect occurrence of the file/folder events raised by users of the CMS. Similarly, for example, as message exchanges (e.g., "chats") and other collaboration events happen between users of the virtual meeting application, messaging application or other collaboration applications, the right side of the screen changes to reflect occurrences of such other collaboration events.

It often happens that the platform that hosts the content management system and the platform that hosts the other systems are different. Moreover, it often happens that the group of users of the content management system are different than the group of users of the virtual meeting, messaging or other collaboration systems. Still further, even when there are one or more users in common between the CMS and the messaging system, their login credentials and/or their aliases and/or their sets of permissions that pertain to objects of the CMS are different from the sets of credentials/aliases/permissions that pertain to features of the virtual meeting, messaging system or other collaboration systems. These differences introduce friction when using a CMS in combination with these third-party applications.

Unfortunately, there are no facilities in place to integrate features of a content management system with such third-party systems. What is needed is an automatic and seamless integration of features of the content management system with features of third-party systems.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for cross-platform collaboration systems, which techniques advance the relevant technologies to address technological issues with legacy approaches. More specifically, the present disclosure describes techniques used in systems, methods, and in computer program products for integrating a content management system with third-party collaboration systems. Certain embodiments are directed to technological solutions for automatically generating a folder and file hierarchy of sharable objects in a content management system based on features or other aspects of a particular third-party collaboration system.

The disclosed embodiments modify and improve over legacy approaches. In particular, the herein-disclosed techniques provide technical solutions that address the technical problems attendant to reconciling users and features of a third-party collaboration system with users and features of a content management system. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for automatically generating a folder and file hierarchy of sharable objects in a content management system based on features or other aspects of a particular third-party collaboration system. As such, herein-disclosed techniques for automatically generating a folder and file hierarchy of sharable objects in a content management system based on features or other aspects of a particular third-party collaboration system overcome long standing yet heretofore unsolved technological problems associated with reconciling users and features of a third-party collaboration system with users and features of a content management system that arise in the realm of computer systems.

Many of the herein-disclosed embodiments for automatically generating a folder and file hierarchy of sharable objects in a content management system based on features or other aspects of a particular third-party collaboration system are technological solutions pertaining to technological problems that arise in the hardware and software arts that underlie content management and collaboration systems. Aspects of the present disclosure achieve performance and other improvements in peripheral technical fields including, but not limited to, human-machine interfaces and collaboration system management.

Some embodiments include a sequence of instructions that are stored on a non-transitory computer readable medium. Such a sequence of instructions, when stored in memory and executed by one or more processors, cause the one or more processors to perform a set of acts for automatically generating a folder and file hierarchy of sharable objects in a content management system based on features or other aspects of a particular third-party collaboration system.

Some embodiments include the aforementioned sequence of instructions that are stored in a memory, which memory is interfaced to one or more processors such that the one or more processors can execute the sequence of instructions to cause the one or more processors to implement acts for automatically generating a folder and file hierarchy of sharable objects in a content management system based on features or other aspects of a particular third-party collaboration system.

In various embodiments, any combinations of any of the above can be combined to perform any variations of acts for integrating a content management system with third-party collaboration systems, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
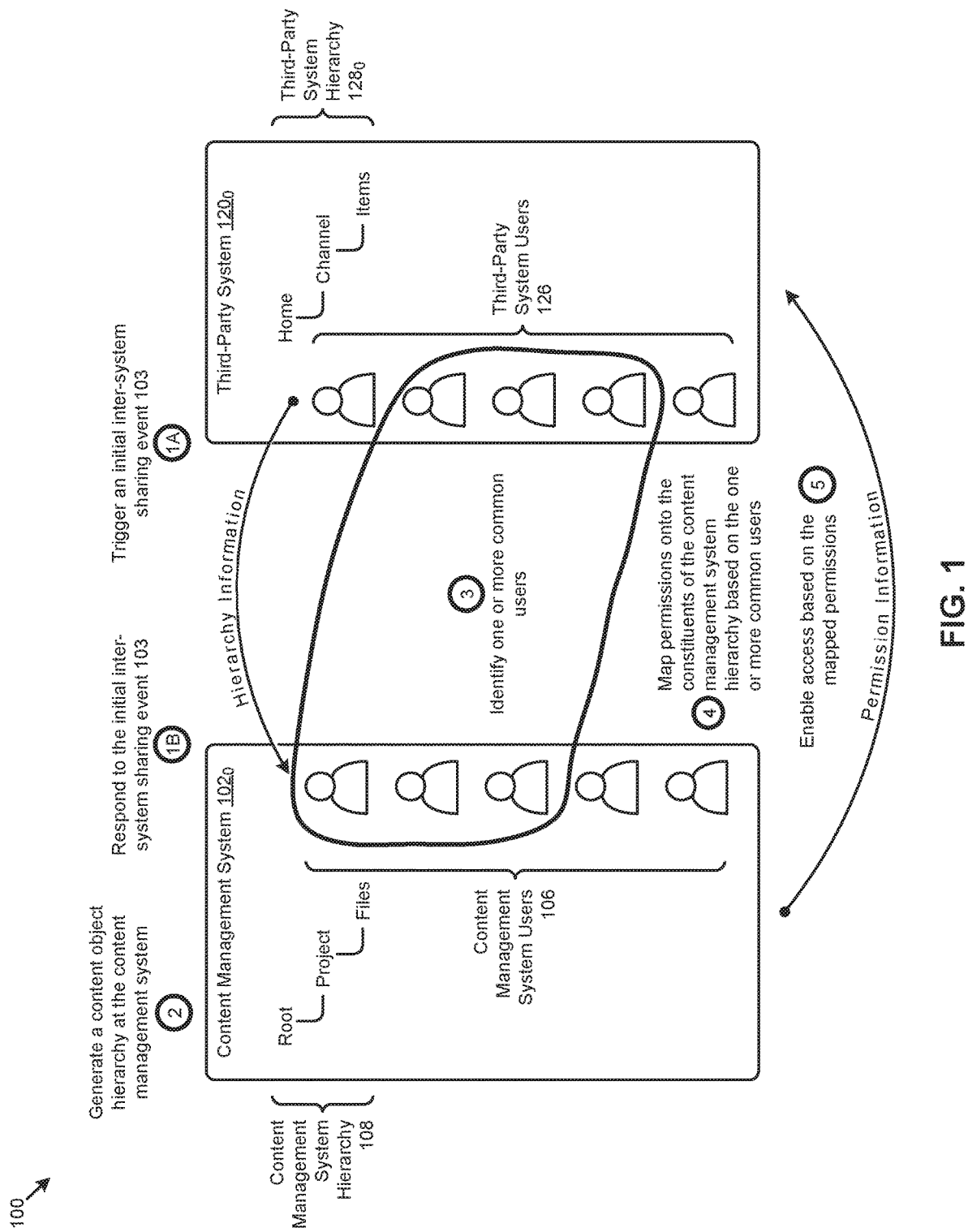
FIG. 1 presents an environment in which embodiments of the present disclosure can be implemented.

Aspects of the present disclosure solve problems associated with using computer systems for reconciling users and features of a third-party collaboration system with users and features of a content management system. These problems are unique to, and may have been created by, various computer-implemented methods for interfacing between a content management system and third-party collaboration systems. Some embodiments are directed to approaches for automatically generating a folder and file hierarchy of sharable objects in a content management system based on features or other aspects of a particular third-party collaboration system. The accompanying figures and discussions herein present example environments, systems, methods, and computer program products for integrating features of a content management system with third-party collaboration systems.

Overview

Content management systems (CMS systems) and messaging systems are often used concurrently by the same user or users. Unfortunately, it often happens that the platform that hosts the content management system and the platform that hosts the messaging system are different, and in some cases are not even hosted by the same entity. For example, a CMS might be hosted by "GigaFiles-R-Us, Inc.", whereas the concurrently-used messaging or collaboration system is hosted by "OnlineMessages-R-Us, Inc." or some other third-party. In fact the particular combination of a CMS and any of a variety of third-party systems may vary by industry, or by enterprise, or by locale, or by department, or even by personal preferences.

Accordingly, when there are two or more collaborators from different industries, or from different enterprises, or situated in different locales, or assigned to different departments, it often happens that at least some members of the group of users of the content management system are different than at least some members of the group of users of the messaging or collaboration system. Moreover, even when there are users in common between the CMS and the messaging or collaboration system, the login credentials and/or their aliases, and/or their sets of permissions that pertain to objects of the CMS, are different from the login credentials and sets of permissions that pertain to objects of the messaging or collaboration system. These differences introduce friction in the combined use models. In some cases, the friction is precisely at the point of collaboration, thus limiting the usefulness of the CMS as well as the third-party systems.

As used herein, such third-party systems comprise applications that are not provided and/or maintained by the content management system but rather are applications that are provided and/or maintained by third parties (e.g., entities other than the maintainer of the content management system) and are merely integrated with the content management system so as to facilitate certain interactions over at least some of the content objects managed at the content management system.

Example third-party systems are external applications that are hosted on different computing infrastructure than the computing infrastructure of the content management system. In many cases, the computing infrastructure for hosting the content management system is located in a first city, whereas the computing infrastructure for hosting the third-party system is located in a second city. In many cases, the second city is geographically distant from the first city. The first infrastructure is interconnected to the second infrastructure by the Internet and/or by leased telecommunications lines.

In some embodiments, third-party applications that are hosted at the second infrastructure communicate with the content management system through use of web services, where at least some of the web services are hosted at the first infrastructure, and where the web services are accessible via a uniform resource identifier (URI), possibly with a string of arguments that are received by the web services at the first infrastructure.

Irrespective of the particular technique or techniques used to communicate between the third-party applications and the content management system, when users interact with content objects using third-party applications, the corresponding interaction events are recorded at the content management system.

The following figures and corresponding written description address the foregoing issues by mapping semantics of the third-party systems onto or into semantics of the CMS. More specifically, the following figures and corresponding written description show how to create structures at the content management system based on features or other aspects of a particular third-party system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 presents an environment in which embodiments of the present disclosure can be implemented. As an option, one or more variations of environment 100 or any aspect thereof may be implemented in the context of the architecture and functionality of the embodiments described herein.

The environment as shown is being presented to introduce how a content management system $102_0$ can be interfaced with an arbitrary type of third-party system $120_0$. More specifically, the environment is being presented to show how events raised at an arbitrary type of third-party system $120_0$ can correspond to events and actions (in response to the events) taken at the content management system.

The specific type of third-party system (e.g., collaboration system, or messaging system, or other tool) may vary without departing from the disclosure. Moreover, the particular technologies involved for communication between the content management system and the third-party system may vary depending on the nature of the third-party system and/or the communication infrastructure available at any moment in time. For example, the content management system and the third-party system may communicate over the Internet (not shown) and/or over leased lines, and/or using application programming interfaces (APIs), and/or using hypertext transport protocols (HTTP), etc.

In the specific example shown, some mechanism (e.g., a trigger) is provided for an initial inter-system sharing event 103 to be raised at the third-party system (operation 1A). The occurrence of that event is communicated to the content management system using any of the aforementioned communication technologies. In turn, the content management system responds to the initial inter-system sharing event (operation 1B). The response by the content management system can vary depending on the type of event, the type of third-party system, and depending on other factors. In the example shown, the initial inter-system sharing event 103 causes the content management system to process hierarchy information.

Specifically, and as shown at operation 2, the content management system forms a content management system hierarchy 108 that comprises folders and files that correspond to the shown third-party system hierarchy $128_0$. The semantics of the third-party system hierarchy are used to determine the constituency of the content management system hierarchy. In the specific example of FIG. 1, a "Root" folder in the content management system hierarchy corresponds to a "Home" location or context in the third-party system hierarchy. A "Project" folder in the content management system hierarchy corresponds to a "Channel" in the third-party system hierarchy, and a "Files" listing in the content management system hierarchy corresponds to an "Items" listing in the third-party system hierarchy. In example embodiments, the initial inter-system sharing event 103 is an access to an http endpoint at the content management system. The endpoint can correspond to a folder or a file or any other content item of the content management system. As such, there is context information that can be derived from the access to the endpoint content management system. As examples, an access to an http endpoint may refer to a file or folder. That file or folder in turn may have an associated owner as well as associated users (e.g., collabedin users), any of which users in turn may have a set of access permissions corresponding to the accessed file or folder.

As earlier mentioned, one aspect of this particular integration if FIG. 1 is to facilitate sharing of content objects between the content management system and the third-party system. One way to facilitate such sharing is to permit access to sharable content objects of the content management system by users of the third-party system, however the relevant set of users of the content management system may be different than the relevant set of users of the third-party system. More particularly, the content management system may have a set of content management system users 106 that include users who are not users of the third-party system users 126. Further, the third-party system users 126 may include users who are not content management system users 106. To facilitate sharing, a common user set is identified (operation 3), and access permissions are mapped onto the constituents of the content management system hierarchy (operation 4). The identified users from operation 3 are granted sharing rights to the constituents of the content management system hierarchy (operation 5).

Any of the foregoing operations can be performed by the content management system, possibly in conjunction with one or more agents at the third-party system. One possible technique for integrating a content management system with a third-party system is shown and described as pertains to FIG. 2.

Figure 2:
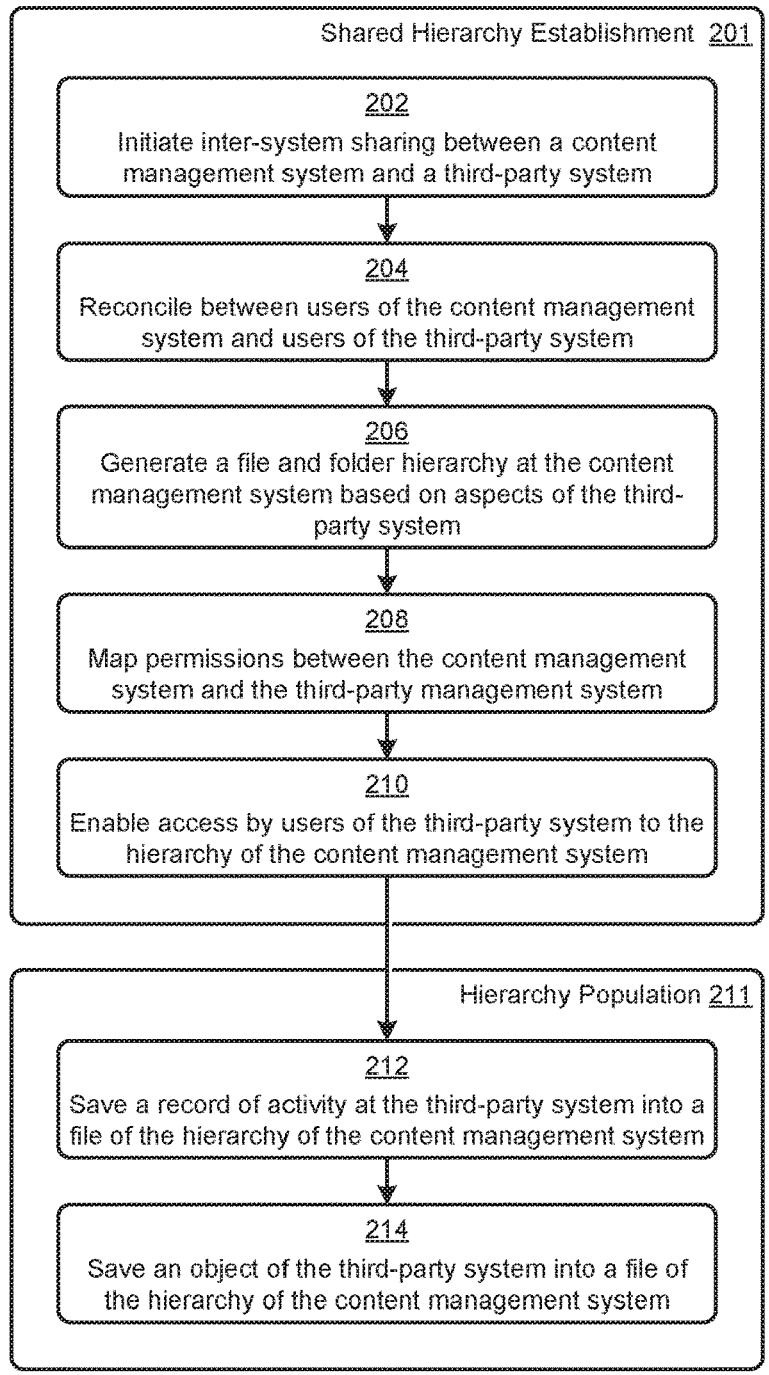
FIG. 2 exemplifies an intra-system integration technique for integrating a content management system with a third-party system, according to an embodiment.

FIG. 2 exemplifies an intra-system integration technique 200 for integrating a content management system with a third-party system. As an option, one or more variations of integration technique 200 or any aspect thereof may be implemented in the context of the architecture and functionality of the embodiments described herein and/or in any in any environment.

The shown flow commences at step 202 when inter-system sharing between a content management system and a third-party system is initiated. This can happen when a user of the third-party system chooses to refer to a folder or file that is stored at the content management system. For example, a user of the third-party system may enter a link to a file that is stored at the content management system. Ostensibly, the foregoing user of the third-party system may want to share some aspect of the file with other users of the third-party system. For example, the foregoing user of the third-party system may want to share some aspect of the file with other users of the third-party system who are associated with the same "channel" or are in the same collaboration session of the third-party system.

To accommodate this, step 204 serves to reconcile between users of the content management system and users of the third-party system. In many cases there are common users, however in some cases the users of the third-party system who are associated with the same "channel" or same collaboration session of the third-party system may not be the same persons as users of the content management system. This sets up a situation that can be addressed by generating a file and folder hierarchy at the content management system based on aspects of the third-party system (step 206), then mapping permissions between the content management system and the third-party management system (step 208). Additional inter-system communication can be carried out between the content management system and the third-party system to enable certain types or scope of access to the constituents of the hierarchy of the content management system (step 210). For example, some users of the third-party system may be granted a high degree of access permissions whereas other users may be granted a reduced degree of access permissions.

Any one or more of the foregoing steps can be performed singly, or in combination, in any order to achieve a shared hierarchy establishment 201. Once a shared hierarchy has been established, steps can be carried out for hierarchy population 211. Strictly as an example for illustration, a record of any types of activity (e.g., chat activity, security grants or denials, mute/unmute, virtual reaction activity, etc.) at the third-party system can be saved into the shared hierarchy (step 212). As another example, an object of the third-party system can be saved into the shared hierarchy (step 214).

Figure 4A:
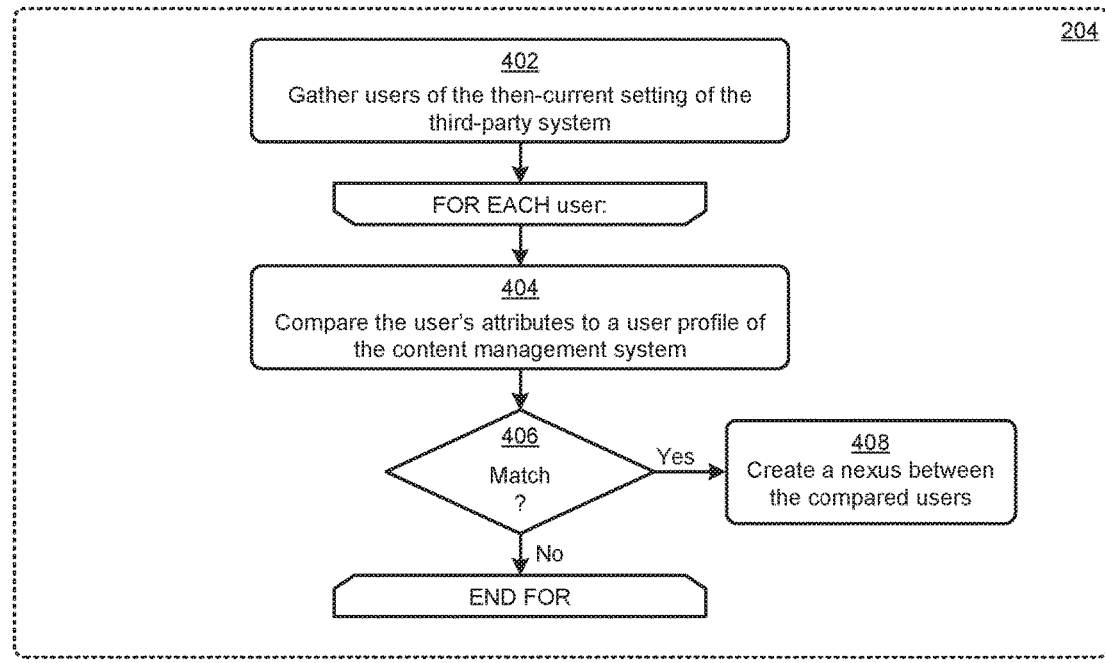
FIG. 4A and FIG. 4B depict example user reconciliation techniques as used when integrating a collaboration system with a third-party system, according to an embodiment.
Figure 4B:
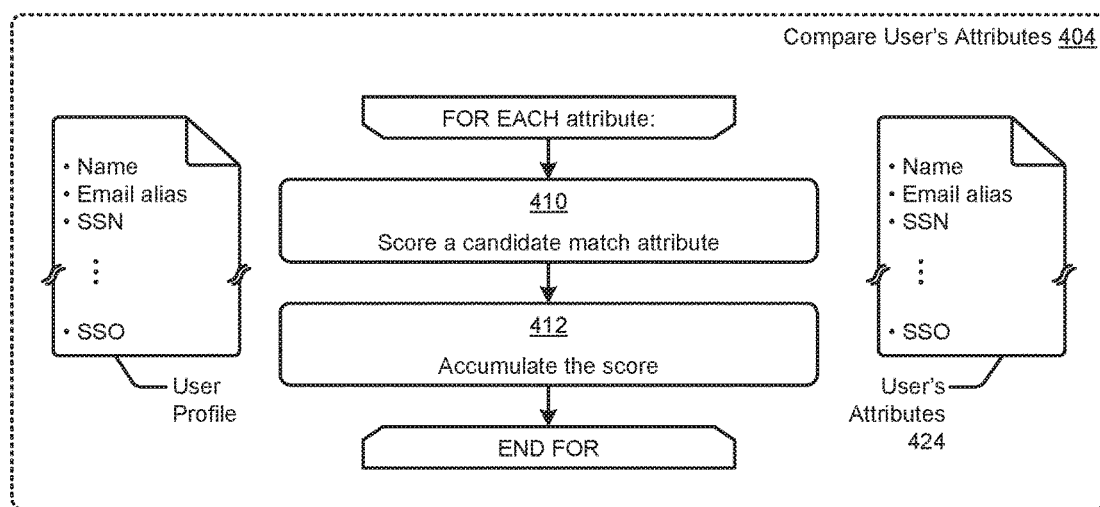
Figure 5:
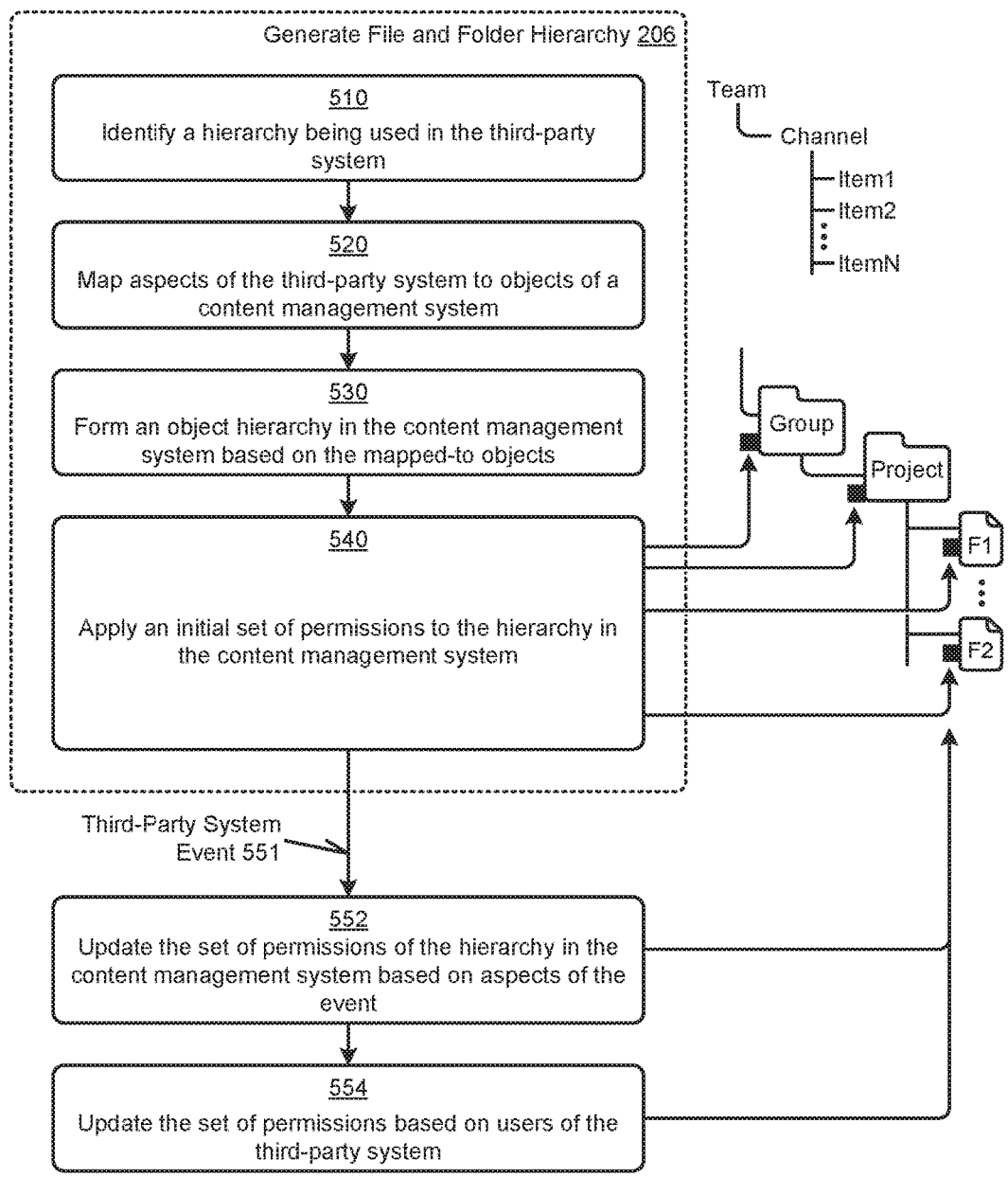
FIG. 5 shows an example hierarchy generation technique as used when integrating a collaboration system with a third-party system, according to an embodiment.

Various specific techniques for reconciling users and for generating a hierarchy at the content management system are shown and described as pertains to FIG. 4A, FIG. 4B, and FIG. 5. Various specific techniques for mapping access permissions are shown and described as pertains to FIG. 6A, FIG. 6B.

Any or all of the foregoing steps can be carried out between a content management system and any number of third-party systems. In some situations any or all of the foregoing steps can be carried out in one or more modules that interface between a content management system and any number of third-party systems. An integration architecture having an illustrative set of modules is shown and described as pertains to FIG. 3A.

Figure 3A:
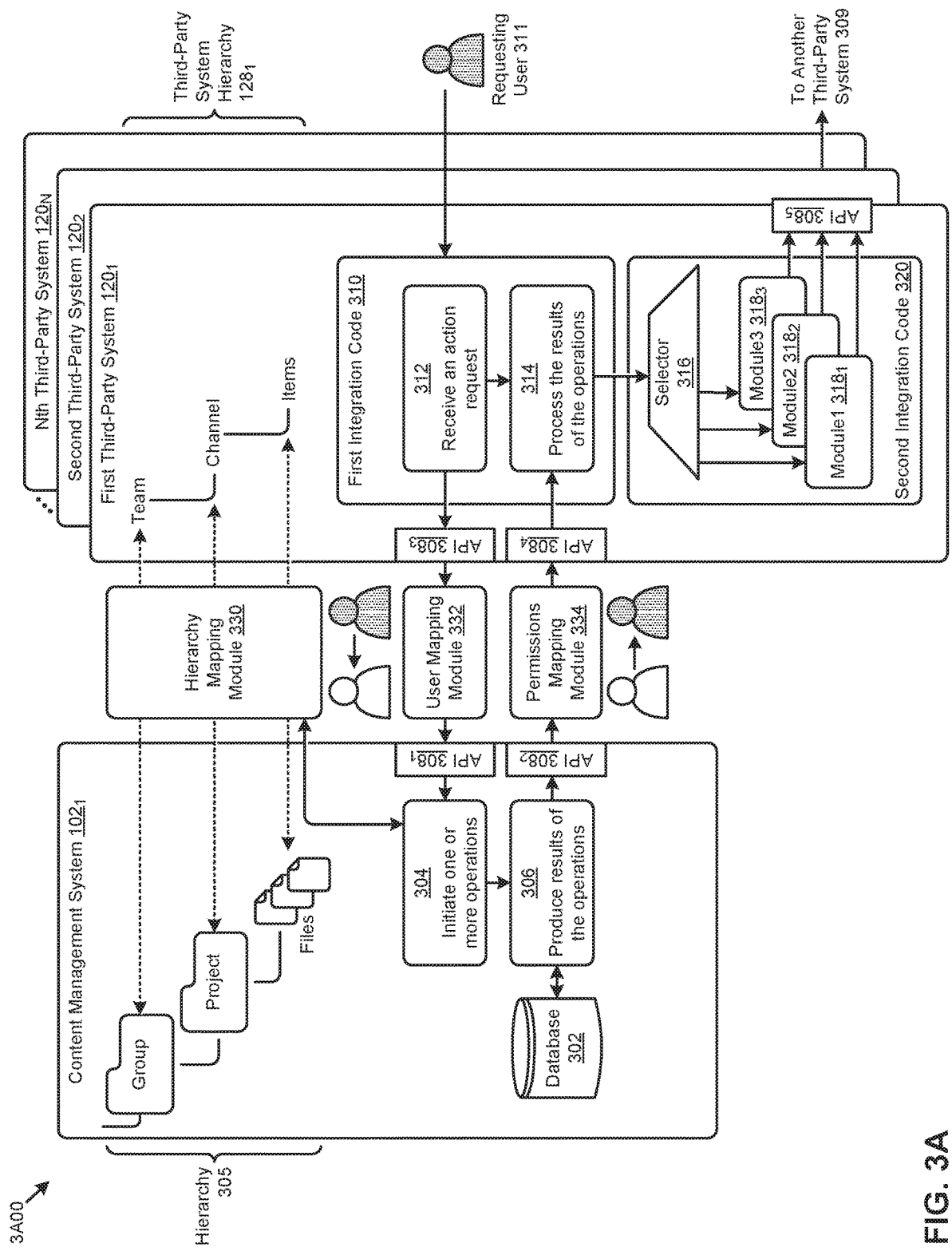
FIG. 3A shows an example intra-system integration architecture for integrating a content management system with third-party collaboration systems, according to an embodiment.

FIG. 3A shows an example intra-system integration architecture 3A00 for integrating a content management system with third-party collaboration systems. As an option, one or more variations of intra-system integration architecture 3A00 or any aspect thereof may be implemented in the context of the architecture and functionality of the embodiments described herein and/or in any in any environment.

The figure is being presented merely to illustrate one possible partitioning of modules that implement hierarchy mapping, user mapping, and access permission mapping. In this particular implementation, the hierarchy mapping is facilitated by a hierarchy mapping module 330, the user mapping is facilitated by a user mapping module 332, and access permissions mapping is facilitated by permissions mapping module 334. The foregoing modules are shown as being situated between the content management system $102_1$ and any one or more third-party systems (e.g., first third-party system $120_1$, second third-party system $120_2$, . . . , and an Nth third-party system $120_N$), however any of the foregoing modules can be implemented in whole or in part within content management system $102_1$, or any of the foregoing modules can be implemented in whole or in part within a third-party system. In many implementations, and as shown, the foregoing modules can be implemented in part within content management system (CMS) and implemented in part within a third-party system (TPS). More specifically, and as shown, integration code (e.g., first integration code 310 and second integration code 320) can be implemented within or in conjunction with the code base of a third-party system. As such, the embodiment of FIG. 3A establishes two integrations between a first third-party system and a content management system. The first integration processes interactions to be taken over a plurality of users and a plurality of content objects of the content management system, whereas the second integration processes events that pertain to another third-party system other than first third-party system.

As shown, the user mapping module acts as a conduit to transmit an action request raised at the third-party system to the content management system. More specifically, first integration code 310 serves to receive an action request (step 312) from a user of the third-party system and send it through API $308_3$. Aspects of the action request are received by the content management system via the CMS's API $308_1$. The content management system then initiates operations corresponding to the request (step 304). A database 302 may be accessed when producing results of the operations (step 306), and any portions of the results may be transmitted to the third-party system. As shown, the permissions mapping module acts as a conduit to transmit results of the operations through the CMS's API $308_2$, which results are received through API $308_4$ and forwarded to first integration code 310, whereupon step 314 serves to process the results of the operation performed at the content management system. The foregoing is merely one integration example and many other partitionings and/or mechanisms for communication between the content management system and a third-party system are possible.

In some implementations, first integration code 310 includes an interface to second integration code 320, which serves to forward action requests to another third-party system 309. As one implementation possibility, the first integration code of the first third-party system may process a request for a content object, and upon receiving the content object corresponding to the request, then the second integration code may forward (e.g., through API $308_5$) some aspect of the content object to another third-party system 309. For example, suppose the content object were a contract to be signed. Further, suppose that the contract has multiple signatories that are situated in different countries around the world. Still further suppose that contracts can be legally e-signed in one country (e.g., the USA) or region using one e-sign agent (e.g., "DocuSign") and can be legally e-signed in another country or region (e.g., the EU) using a different e-sign agent (e.g., "YouSign"). In such a situation, selector 316 chooses from among several options (e.g., module1 $318_1$, module2 $318_2$, or module1 $318_3$), any of which options are configured to send messages to another third-party system 309.

Returning to the discussion of the hierarchy mapping module 330, the user mapping module may act in conjunction with the hierarchy mapping module. Specifically, the hierarchy mapping module may rely on communication with the user mapping module 332 when generating an instance of hierarchy 305. The hierarchy mapping module can map from an explicit or implicit hierarchy of the third-party system. In the example shown, the third-party system hierarchy $128_1$ is represented as an implied hierarchy in which a particular team (e.g., the shown "Team" level) has a channel (e.g., the shown "Channel" level) over which the team members communicate as pertains to items (e.g., the shown "Items" level).

The particular access permissions that are applied to any folder or file of a particular generated instance of hierarchy 305 can vary over time. More specifically, the hierarchy mapping module may apply an initial set of access permissions to a generated hierarchy, and then change the access permissions on the hierarchy based on events that are raised at the third-party system. Such an initial set of access permissions may be based on access permissions that are already applied in the content management system to a particular reconciled user. Later, depending on activities raised at the third-party system, the access permissions can be changed. To illustrate, suppose that requesting user 311 is a user that also has a user profile at the content management system, and suppose that the channel of the third-party system is deemed to be mapped to a particular project. Then it might be possible to assign the initial set of access permissions to be the access permissions that correspond to the particular reconciled user with respect to the particular project. Later, it might happen that a new user is added to the channel of the third-party system. Responsive to that addition, the set of access permissions applied to the generated hierarchy can then be changed to reflect the additional user of the third-party system.

Figure 3B:
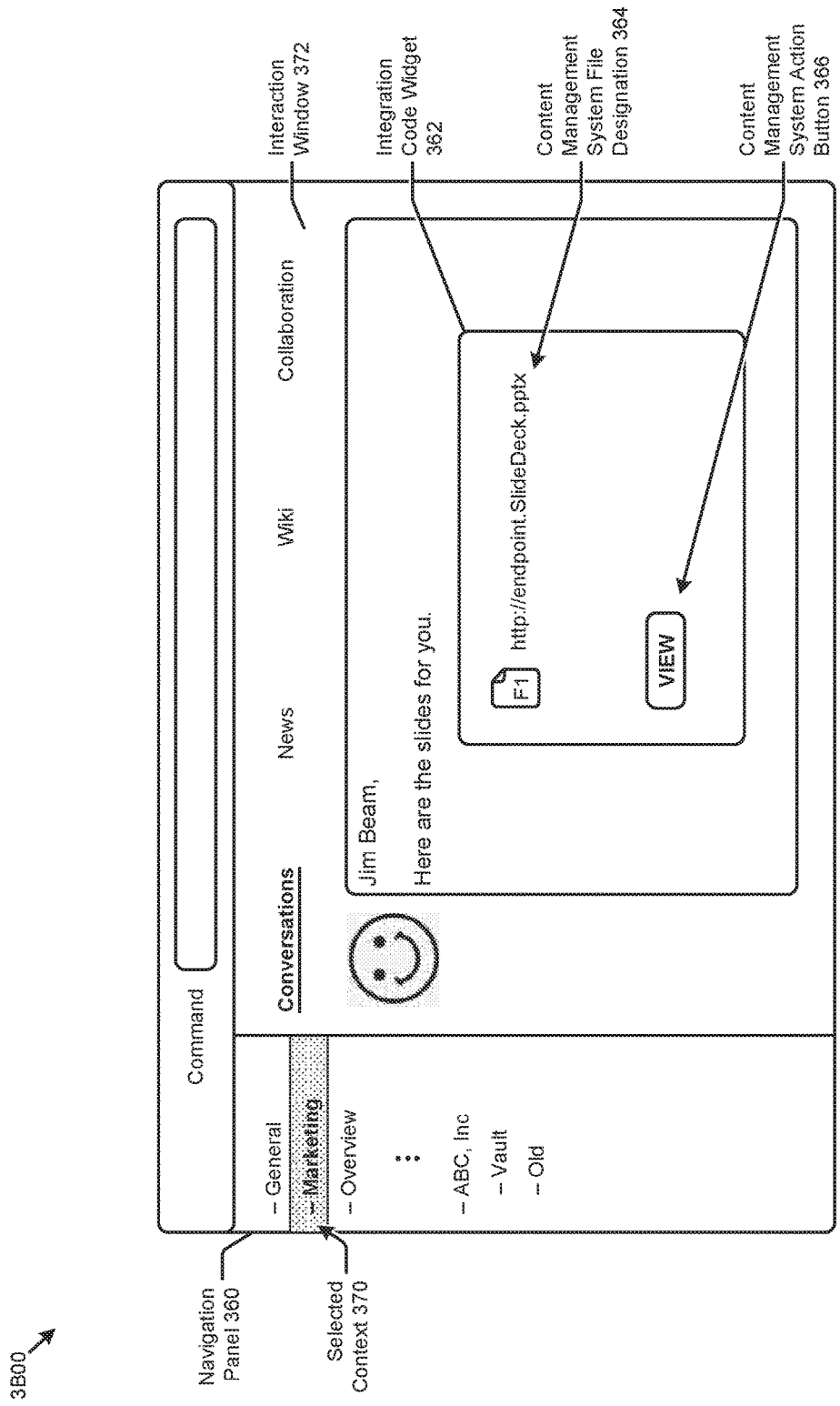
FIG. 3B shows an example user interface for integrating a third-party collaboration system with a content management system, according to an embodiment.

FIG. 3B shows an example user interface 3B00 for integrating a third-party collaboration system with a content management system. As an option, one or more variations of the example user interface 3B00 or any aspect thereof may be implemented in the context of the architecture and functionality of the embodiments described herein and/or in any in any environment.

The shown user interface depicts a navigation panel 360 that depicts several selectable contexts. The shown example depicts a selected context 370 (e.g., the shown user selection of "Marketing"). Given the user selection of a context, an interaction window 372 of the user interface is populated with graphical elements. In the shown example, interaction window 372, an integration code widget 362 includes graphical elements corresponding to a content management system file (e.g., content management system file designation 364) and an action button (e.g., content management system action button 366). A user can interact with the button, thereby raising an event from within the integration code, which is in turn within the interaction window of the third-party system. As such, and due at least in part to operation of the interaction code widget, the content management system can receive events corresponding to the user interaction with the button, thereafter process the events. In the shown example, the action is to "View" the file "F1", which is a content management system content object accessible at endpoint "http://endpoint.SlideDeck.pptx".

The foregoing examples of FIG. 3A and FIG. 3B are merely for illustrative purposes, and many other implementations are possible, some of which are shown and described as pertains to FIG. 4A and FIG. 4B.

FIG. 4A and FIG. 4B depict example user reconciliation techniques as used when integrating a collaboration system with a third-party system. As an option, one or more variations of the user reconciliation techniques or any aspect thereof may be implemented in the context of the architecture and functionality of the embodiments described herein and/or in any in any environment.

The users of a third-party system, and more particularly the users of a third-party system who are engaged in a particular setting (e.g., on a channel, or in an online meeting, etc.) may be the same users that exist at the content management system. However, it can happen that even though the users are the same natural persons, the users may have different online persona (e.g., login name, credentials, etc.) between systems. Accordingly, there needs to be some way to reconcile a user persona from a third-party system to a content management system, and vice versa.

In some cases, a particular user of a third-party system may interact through the third-party system to the content management system in a manner that causes the particular user of a third-party system to sign-in to the content management system (e.g., to initially go about sharing a document that is stored at the content management system). In such a case, the nexus between the two user personas is established by the sign-in operation. However, there are many other situations where a nexus between the two user personas (e.g., a first user persona at the third-party system and a second user persona at the content management system) can be established by other means.

The flow of FIG. 4A corresponds to step 204 of FIG. 2. As shown the flow commences by gathering all of the users of a particular setting within a third-party system (step 402). For example, all of the users that are logged-in to a particular channel, or all of the users that are logged-in to a particular online meeting are gathered. Further steps of the flow of FIG. 4A are carried out to determine a match (or lack of a match) with users of the content management system. Specifically, for each user gathered in step 402, any of the user's attributes as might be available at the third-party system are compared with entries within a user profile corpus of the content management system (step 404). If the comparison operations result in a match (decision 406), then the "Yes" branch is taken and the two user personas are deemed to refer to the same natural person (step 408). In some situations the comparison operations result in a partial match. In such situations, individual comparisons of user attributes are compared individually and a score is accumulated. If the accumulated score breaches a certain threshold, then the two user personas are deemed to refer to the same natural person.

One possible implementation for step 404 is shown and described as pertains to FIG. 4B. In this implementation, for a given user, and for each of a set of that given user's attributes 424, each of the given user's attributes 424 is scored (step 410) using a comparison between the particular user attributes in the third-party system to characteristics of user profiles in the content management system. Strictly as examples, if there is a match as between the "Name" attribute of the third-party system to a "Name" field of a user profile of the content management system, then a score accumulator is increased (step 412). Additionally or alternatively, if there is a match as between the "Email Alias" attribute of the third-party system to an "Email Alias" field of a user profile of the content management system, then a score accumulator is increased, etc. Such a matching operation can be carried out over a plurality of attributes including a social security number (SSN), a phone number, a single sign-on (SSO) configuration, etc.

FIG. 5 shows an example hierarchy generation technique 500 as used when integrating a collaboration system with a third-party system. As an option, one or more variations of hierarchy generation technique 500 or any aspect thereof may be implemented in the context of the architecture and functionality of the embodiments described herein and/or in any in any environment.

The shown hierarchy generation technique can be employed whenever there is a hierarchy in the third-party system that lends itself to a hierarchy of objects. As such, the implementation of FIG. 5 is merely an example implementation of step 206 from FIG. 2 and many alternatives or variations are possible. In the shown implementation, a hierarchy of the third-party system is identified (step 510). Aspects of the identified hierarchy are mapped to objects of the content management system. A hierarchy of the third-party system can be determined in whole or in part using any known means. For example, the hierarchy of the third-party system can be defined by a table, or by a series of parenthesized or delimiter-separated hierarchical elements, or the hierarchy of the third-party system can be codified in Java or JSON, etc. The thusly-defined hierarchy of the third-party system can drive a mapping algorithm to map from aspects of the hierarchy of the third-party system to objects of the content management system (step 520). In some cases, a particular mapping algorithm is selected based on the specific third-party system of interest. In some cases, a particular mapping algorithm is selected based on the then-current configuration of the specific third-party system of interest. In some cases, a particular mapping algorithm is selected based on the then-current parameters of a then-current session of the specific third-party system of interest. In some cases, a "Channel" of the third-party system is mapped to a project folder and an "Item" (e.g., a shared document, a discussion thread, a comment thread, an event, etc.) is mapped to a file.

In some cases, the third-party system is a web conferencing facility (e.g., MICROSOFT OFFICE TEAMS®, ZOOM®, etc.), which web conferencing facility has an implied hierarchy built into the use model. Specifically, a top level of a third-party web conferencing hierarchy might correspond to the participants of the web conference session, whereas a second level of the third-party web conferencing hierarchy might correspond to a particular share (e.g., shared desktop, shared application, shared whiteboard, etc.), and whereas a third level of the third-party web conferencing hierarchy might correspond to particular events or types of events that are raised during the presentation of the share to the participants (e.g., an annotation on the shared desktop, chat contents that were raised while the shared application was the active share, security settings that were changes while the shared whiteboard was the active share, etc.).

In some cases, the third-party system is a messaging facility (e.g., "Slack", "Wire", "Pronto", "Flock", etc.), which web conferencing facility has an implied hierarchy built into its use model. For example, a "Department" may have one or more "Channels", and each channel might have "Subscribers".

In some cases, a third-party system is a web conferencing application that includes a native messaging facility (e.g., a chat facility). In such cases, the occurrences of messaging events (e.g., sending some text to another participant, or broadcasting a URL to all participants, etc.) can be timestamped by the web conferencing application in a manner that relates the timestamped event to the then-current web conferencing share. For example, at the moment that "Desktop A" is being shared by "User A", it can happen that "User B" sends chat content. Since the moment that "Desktop A" is being shared by "User A" can be timestamped, and since the moment that "User B" sends chat content to the participants can also be timestamped, those two different aspects of the web conference can be inter-related, at least by the specific time indicated in the timestamp.

The hierarchy of third-party system being thusly defined and mapped to a corresponding hierarchy of the content management system can be used to form an object hierarchy in the content management system (step 530). Any one or more of the content objects of the content management system can take on a particular set of permissions (step 540). In some cases, constituents of the object hierarchy can initially take on access permissions that are derived from a particular user. In some cases, constituents of the object hierarchy can initially take on access permissions that are derived from a particular channel. In some cases, constituents of the object hierarchy can initially take on access permissions that are derived from a particular item.

Any of the foregoing initial sets of access permissions and/or subsequently applied permission can be overwritten. More particularly, access permissions applied to the object hierarchy can be updated based on aspects of events or even a single third-party system event 551 that occurs at the third party system (step 552). Additionally or alternatively, access permissions applied to the object hierarchy can be updated based on aspects of the users of the third-party system (step 554). As specific examples, (1) access permissions applied to the object hierarchy can be updated based on an addition of a user at the third-party system; and/or (2) access permissions applied to the object hierarchy can be updated based on a deletion of a user at the third-party system; and/or (3) access permissions applied to the object hierarchy can be updated based on a security setting change that occurs at the third-party system.

Any of the foregoing examples of updating a permission can be handled by code that operates within the CMS either solely, or in conjunction with code that operates within the third-party system. The code might execute as permissions mapping module 334 that is situated to interface between the CMS and the TPS. In particular, and referring again to FIG. 3, initial and ongoing permissions handling might comport with any known codification technique and/or any known architecture. Strictly for illustration, an example permission mapping architecture is shown and described as pertains to FIG. 6A.

Figure 6A:
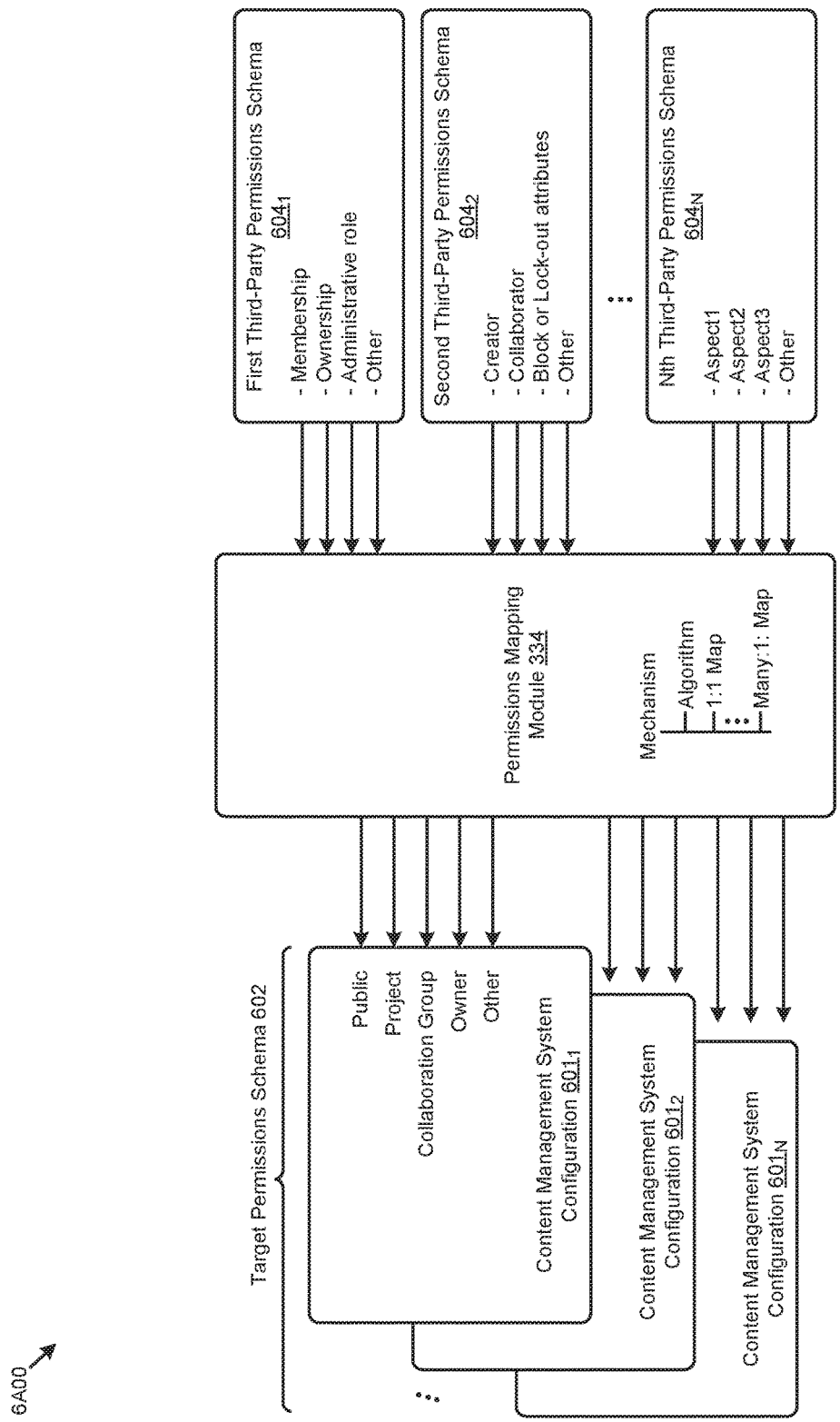
FIG. 6A depicts an example permission mapping architecture as used when integrating a collaboration system with a third-party system, according to an embodiment.

FIG. 6A depicts an example permission mapping architecture 6A00 as used when integrating a collaboration system with a third-party system. As an option, one or more variations of permission mapping architecture 6A00 or any aspect thereof may be implemented in the context of the architecture and functionality of the embodiments described herein and/or in any in any environment.

As shown, an instance of a permissions mapping module 334 can be situated as a translator between a permission schema of a third-party system (e.g., first third-party permission schema $604_1$, second third-party permission schema $604_2$, ..., Nth third-party permission schema $604_N$, etc.) and any target permissions schema 602 and/or any particular target permissions schema configuration (e.g., content management system configuration $601_1$, content management system configuration $601_2$, ..., content management system configuration $601_N$). The permissions mapping module 334 can be configured with any number of mechanisms by which a permissions schema of a third-party system can be mapped into any target permissions schema.

Strictly as examples, one mechanism might be implemented as an algorithm using solely code. Another mechanism might be implemented as an algorithm plus a one-to-one map. Another mechanism might be implemented as an algorithm plus a many-to-one map. Yet another mechanism might choose a particular algorithm and/or a particular map based at least in part on a subject target permissions schema configuration and/or a particular permissions schema of a particular third-party system. In some cases, a particular permissions schema of a third-party system may be explicit (e.g., where security-related permissions are assigned by a host or administrator) whereas, in other cases, a particular permissions schema of a third-party system may be derived. In some implementations, a particular permissions schema of a third-party system may be codified into an algorithm that is selected based on an identifier of the third-party system. For example, if the third-party system can be identified as "Zoom" then a permissions schema that is determined a priori can be selected. The algorithm can cast the permissions schema that had been determined a priori as pertaining to "Zoom" into a target permissions schema. In some embodiments, a particular target permissions schema is based on a particular configuration, and as such the algorithm can cast the permissions schema that had been determined a priori into a target permissions schema that is based, at least in part, on the particular content management system configuration (e.g., content management system configuration $601_1$).

A third-party permission schema can be based, in whole or in part, on aspects of the third-party system. For example, and as shown, a permissions schema might include aspects of any one or more of, a membership (e.g., membership to a particular session or channel), and/or an ownership (e.g., assignment of a host role, ownership of a channel, etc.), and/or a role (e.g., administrative role, creator role, collaborator role), and/or an indication of explicit access permissions (e.g., block or lock-out attributes), and/or other aspects.

Any/all of the permissions of a particular permissions schema, whether explicit or whether derived, can be enumerated for use by a permissions mapping algorithm. One possible permissions mapping algorithm is shown and described as pertains to FIG. 6B.

Figure 6B:
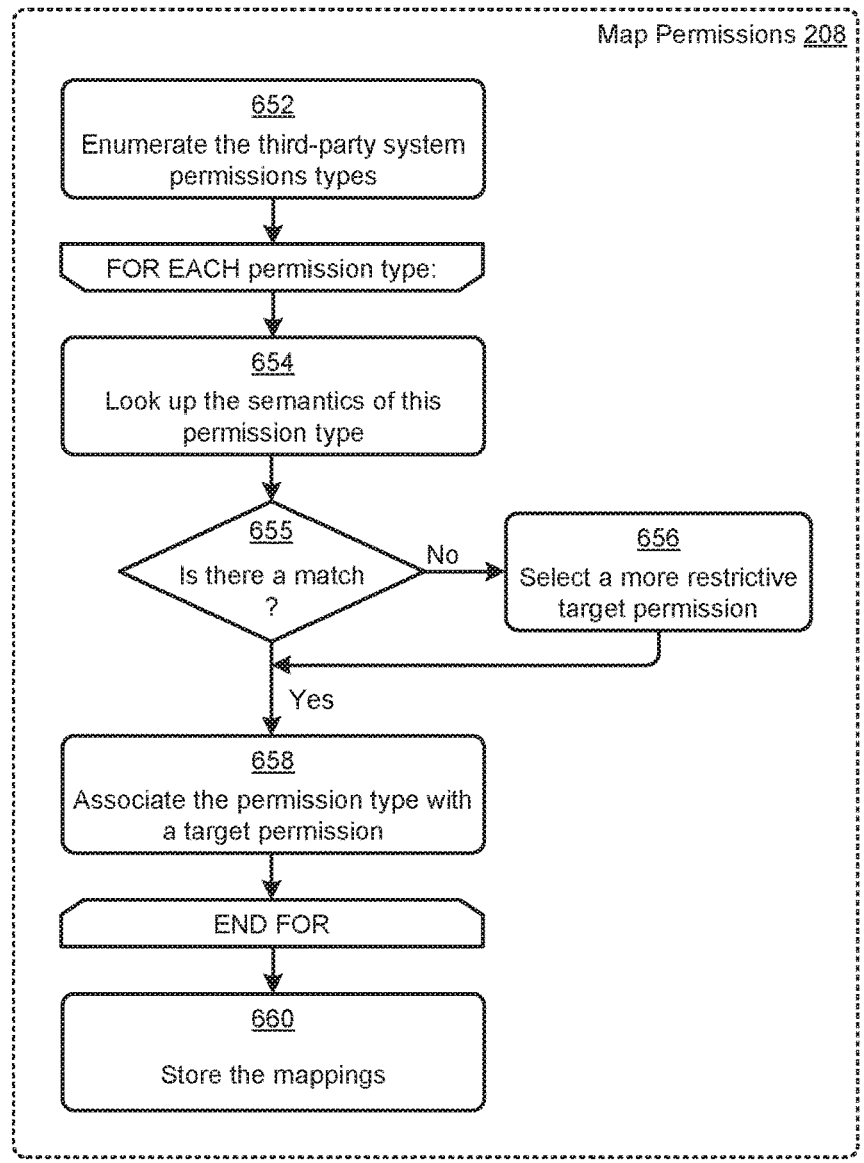
FIG. 6B depicts an example permission mapping algorithm as used when integrating a collaboration system with a third-party system, according to an embodiment.

FIG. 6B depicts an example permission mapping algorithm 6B00 as used when integrating a collaboration system with a third-party system. As an option, one or more variations of permission mapping algorithm 6B00 or any aspect thereof may be implemented in the context of the architecture and functionality of the embodiments described herein and/or in any in any environment.

The mapping of access permissions addresses several functions: (1) users of the third-party system who have access permissions to a content object of the content management system should retain such access permissions even when such users are accessing content objects from integration code of a third-party system; (2) users of the third-party system who do not initially have access permissions to a content object of the content management system should still not initially have permission to access the content object even when such users are attempting to access the content object from integration code of a third-party system; (3) users of the third-party system who do not initially have access permissions to a content object of the content management system can be given permission to access the content object if granted access by an authorized user of the content management system; and (4) certain users of the third-party system who have particular levels of authorization or access permissions can be granted override permissions to access content objects of the content management system.

As such, when mapping permissions between a third-party system and a content management system, the mapping should process the semantics of permissions of the third-party system when mapping to permissions of the content management system. The flow of FIG. 6B implements such a process. More specifically, the flow of FIG. 6B implements a mapping corresponding to step 208 of FIG. 2, whereby permissions to access content objects of the content management system can be granted based on the permissions schema of the third-party system. The shown flow commences at step 652 where each specific permission setting or set of permissions settings in the permissions schema of the third-party system is enumerated as a permission type. Then each permission type is evaluated. The semantics of a permission type are looked-up (step 654) and then compared against the semantics of permissions at the content management system to determine if there is a sufficient correspondence or match. If so (the "Yes" branch of decision 655), then the permission type of the third-party permission schema is associated with the content management system permission (step 658). If not (the "No" branch of decision 655), then a more restrictive target permission is selected (step 656). The determined mappings are stored (step 660) and the flow is ended.

In some cases, the flow of FIG. 6B is performed for a particular setting of the third-party system (e.g., for a particular channel or session). In other cases, the flow of FIG. 6B is performed for each user that is logged in to a particular setting of the third-party system.

Additional Embodiments of the Disclosure

Instruction Code Examples

Figure 7A:
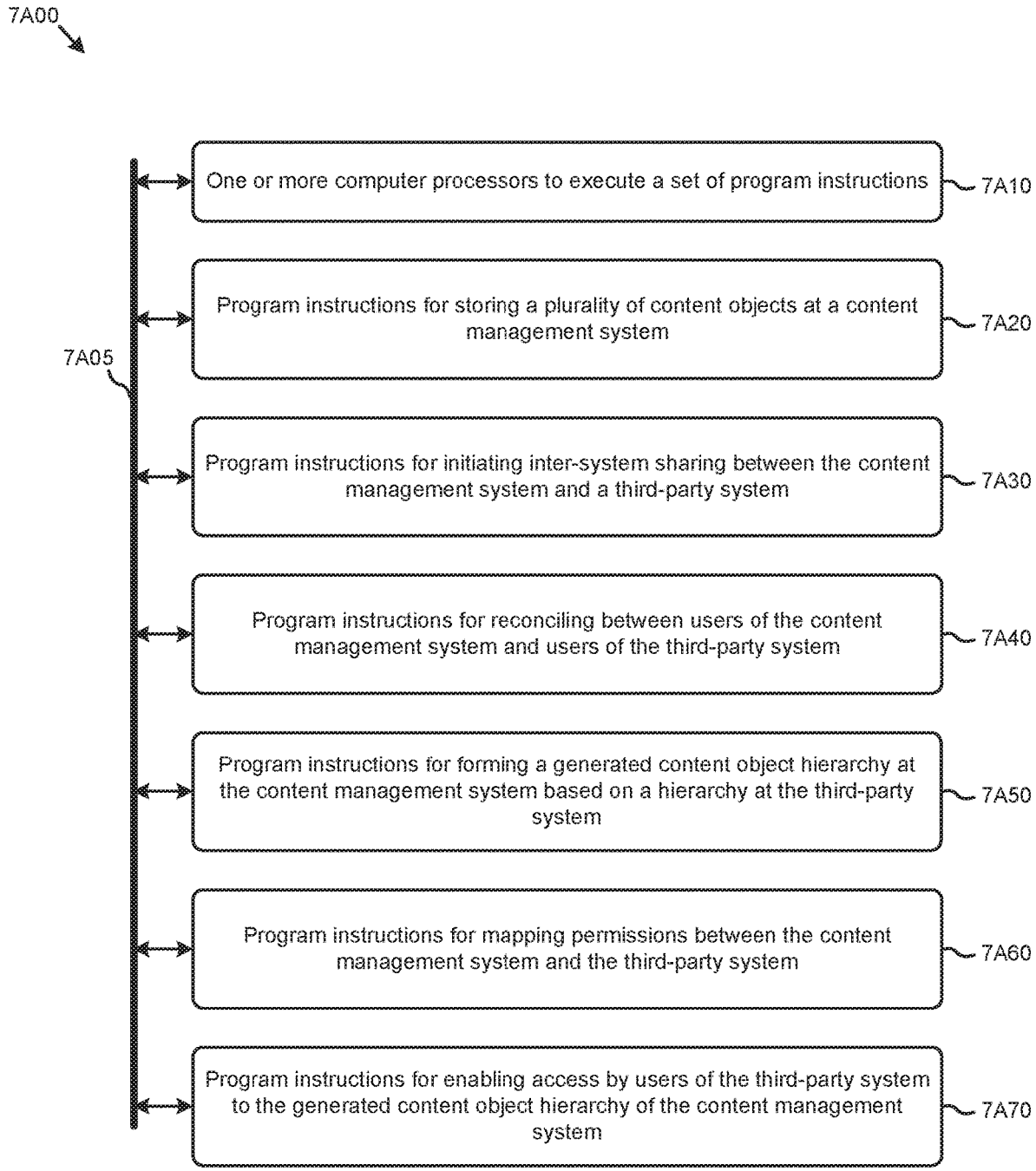
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address reconciling users and features of a third-party collaboration system with users and features of a content management system. The partitioning of system 7A00 is merely illustrative and other partitions are possible. As an option, system 7A00 may be implemented in the context of the architecture and functionality of the embodiments described herein. Of course, however, system 7A00 or any operation therein may be carried out in any desired environment.

System 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: storing a plurality of content objects at a content management system (module 7A20); initiating inter-system sharing between the content management system and a third-party system (module 7A30); reconciling between users of the content management system and users of the third-party system (module 7A40); forming a generated content object hierarchy at the content management system based on a hierarchy at the third-party system (module 7A50); mapping permissions between the content management system and the third-party system (module 7A60); and enabling access by users of the third-party system to the generated content object hierarchy of the content management system (module 7A70).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

Figure 7B:
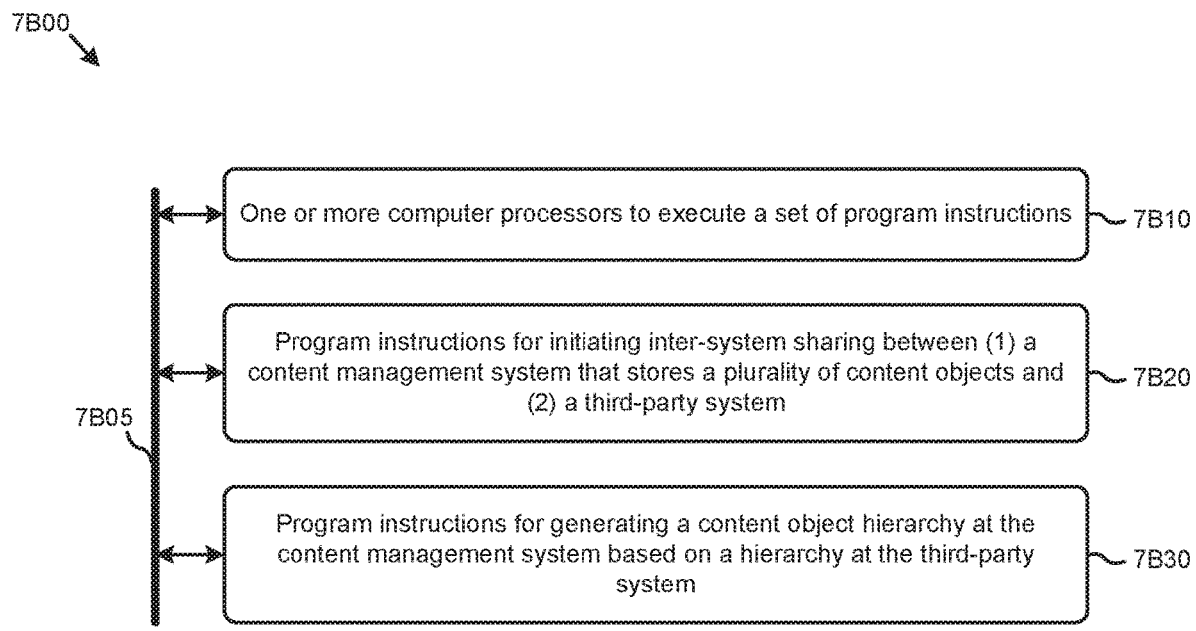

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: initiating inter-system sharing between (1) a content management system that stores a plurality of content objects and (2) a third-party system (module 7B20); and generating a content object hierarchy at the content management system based on a hierarchy at the third-party system (module 7B30).

System Architecture Overview

Additional System Architecture Examples

Figure 8A:
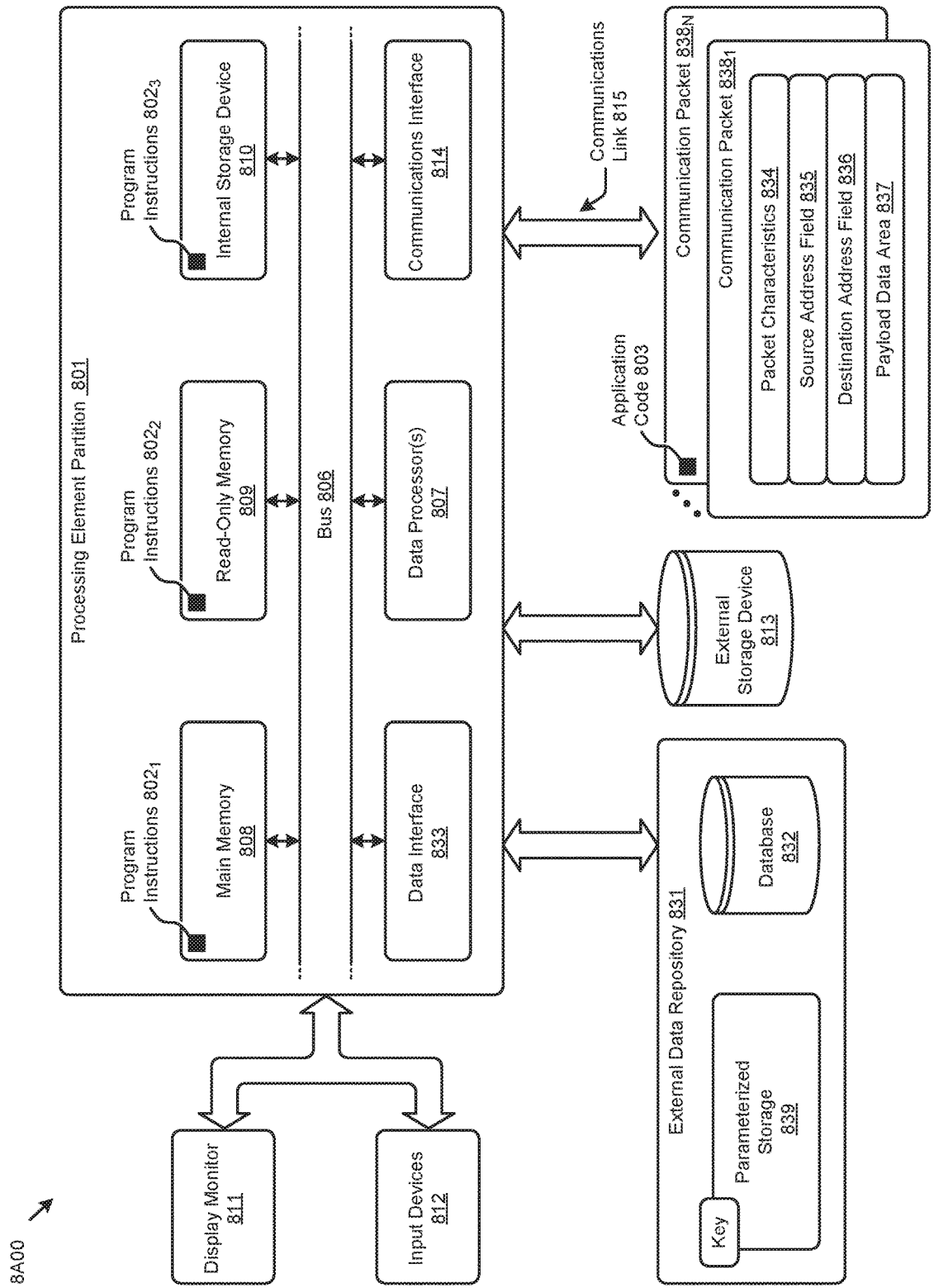
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to integrating a content management system with third-party collaboration systems. A module may include one or more state machines and/or combinational logic used to implement or facilitate the operational and/or performance characteristics pertaining to integrating a content management system with third-party collaboration systems.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of integrating a content management system with third-party collaboration systems). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to integrating a content management system with third-party collaboration systems, and/or for improving the way data is manipulated when performing computerized operations pertaining to automatically generating a folder and file hierarchy of sharable objects in a content management system based on features or other aspects of a particular third-party collaboration system.

Figure 8B:
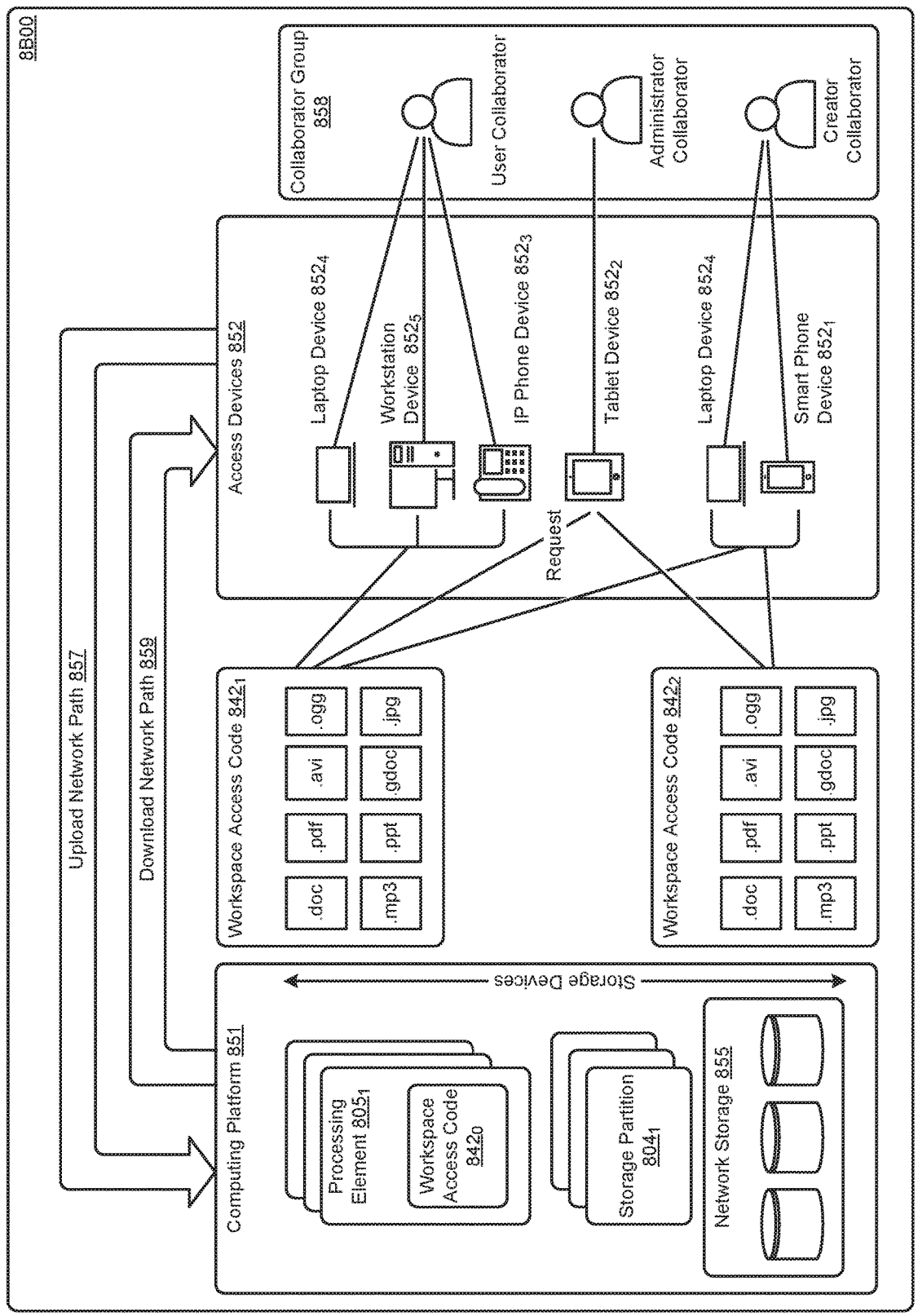

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for cross-platform collaboration, the method comprising:
    initiating inter-system sharing between a content management system (CMS) that stores a plurality of content objects and a third-party system;
    generating a content object hierarchy comprising a CMS hierarchical level for storing at least one content object of the plurality of content objects at the content management system based at least in part on a mapping that correlates the content object hierarchy to a hierarchy at the third-party system, wherein
        the hierarchy at the third-party system comprises a third-party hierarchical level,
        the third-party hierarchical level at the third-party system corresponds to the CMS hierarchical level at the content management system,
        the third-party hierarchical level and the CMS hierarchical level have different identifiers, and
        the third-party hierarchical level on the third-party system corresponds to the CMS hierarchical level in that the CMS hierarchical level at the content management system is generated at least by the mapping that maps the third-party hierarchical level at the third-party system to the content object hierarchy at the content management system;
    determining an access permission at least by mapping a third-party permission schema on the third-party system to a CMS permission schema on the content management system for at least one user to access the content object hierarchy with the access permission, wherein the CMS schema is equally or more restrictive than the third-party permission schema for accessing the content object hierarchy; and
    granting, to at least one user of the third-party system, the access permission to access the at least one of the plurality of content objects in the content object hierarchy at least by:
        generating a graphical user interface window that includes an action user interface element for online interaction with the at least one of the plurality of content objects, based at least in part upon the access permission granted to the at least one user.

2. The method of claim 1, further comprising: reconciling between users of the content management system and users of the third-party system at least by comparing attributes of the users of the third-party system with attributes of the users of the content management system.

3. The method of claim 1, further comprising mapping access permissions between the content management system and the third-party system based at least in part upon semantics of the CMS schema on the content management system and semantics of the third-party permission schema on the third-party system.

4. The method of claim 3, further comprising:
    assigning the access permissions to the plurality of content objects of the content management system based at least in part on a result of mapping the access permissions between the content management system and the third-party system; and
    generating the graphical user interface window comprises:
        incorporating an integration code widget and a user interface element corresponding to the at least one of the plurality of content objects into the graphical user interface window; and
        incorporating an action user interface element which, when actuated by the at least one user in the graphical user interface window, raises an event from within the interaction code widget.

5. The method of claim 3, wherein at least one of the access permissions that is granted to a third-party system user to access the content object hierarchy of the content management system is more restrictive than a corresponding access permission that is granted to the third-party system user to access objects of the third-party system, and the content object hierarchy is generated for storing the plurality of content objects in the CMS hierarchical level or in one or more folders in the CMS hierarchical level.

6. The method of claim 1, further comprising generating a CMS parent hierarchical level at least by mapping a third-party parent hierarchical level to the content object hierarchy, wherein
- the hierarchy at the third-party system further comprises the third-party parent hierarchical level that is a parent of the third-party hierarchical level according to a parent-child relationship,
- the content object hierarchy at the content management system further comprises the CMS parent hierarchical level that is a parent of the CMS hierarchical level according to the parent-child relationship, and
- the CMS parent hierarchical level has a CMS parent identifier that is different from a third-party parent identifier of the third-party parent hierarchical level.

7. The method of claim 1, further comprising:
- maintaining a plurality of integrations between a plurality of third-party applications and the content management system;
- accessing a first integration at a first third-party application to select a second integration associated with a second third-party application; and
- invoking, by the second integration, a communication to the second third-party application, wherein the at least one user of the third-party system is a different user than users that collaborate on the plurality of content objects on the content management system.

8. A non-transitory computer readable medium having stored thereon a sequence of instructions which, when stored in memory and executed by one or more processors causes the one or more processors to perform a set of acts for cross-platform collaboration, the set of acts comprising:
- initiating inter-system sharing between a content management system (CMS) that stores a plurality of content objects and a third-party system; and
- generating a content object hierarchy comprising a CMS hierarchical level to include at least one of the plurality of content objects at the content management system based at least in part on a mapping that correlates the content object hierarchy to a hierarchy at the third-party system, wherein
  - the hierarchy at the third-party system comprises a third-party hierarchical level,
  - the third-party hierarchical level at the third-party system corresponds to the CMS hierarchical level at the content management system,
  - the third-party hierarchical level and the CMS hierarchical level have different identifiers, and
  - the third-party hierarchical level on the third-party system corresponds to the CMS hierarchical level in that the CMS hierarchical level at the content management system is generated at least by the mapping that maps the third-party hierarchical level at the third-party system to the content object hierarchy at the content management system;
- determining an access permission at least by mapping a third-party permission schema on the third-party system to a CMS permission schema on the CMS for at least one user to access the content object hierarchy with the access permission, wherein the CMS schema is equally or more restrictive than the third-party permission schema for accessing the content object hierarchy; and
- granting, to at least one user of the third-party system, the access permission to access the at least one of the plurality of content objects in the content object hierarchy at least by generating a graphical user interface window that includes an action user interface element for online interaction with the at least one of the plurality of content objects, based at least in part upon the access permission granted to the at least one user.

9. The non-transitory computer readable medium of claim 8, further comprising instructions which, when stored in memory and executed by the one or more processors causes the one or more processors to perform the set of acts, the set of acts further comprising reconciling between users of the content management system and users of the third-party system at least by comparing attributes of the users of the third-party system with attributes of the users of the content management system.

10. The non-transitory computer readable medium of claim 8, further comprising instructions which, when stored in memory and executed by the one or more processors causes the one or more processors to perform the set of acts, the set of acts further comprising mapping access permissions between the content management system and the third-party system based at least in part upon semantics of the CMS schema on the content management system and semantics of the third-party permission schema on the third-party system.

11. The non-transitory computer readable medium of claim 10, further comprising instructions which, when stored in the memory and executed by the one or more processors causes the one or more processors to perform the set of acts, the set of acts further comprising:
- assigning access permissions to the plurality of content objects of the content management system based at least in part on a result of mapping the access permissions between the content management system and the third-party system; and
- generating the graphical user interface window comprises:
  - incorporating an integration code widget and a user interface element corresponding to the at least one of the plurality of content objects into the graphical user interface window; and
  - incorporating an action user interface element which, when actuated by the at least one user in the graphical user interface window, raises an event from within the interaction code widget.

12. The non-transitory computer readable medium of claim 10, wherein at least one of the access permissions that is granted to a third-party system user to access the content object hierarchy of the content management system is more restrictive than a corresponding access permission that is granted to the third-party system user to access objects of the third-party system, and the content object hierarchy is generated for storing the plurality of content objects in the CMS hierarchical level or in one or more folders in the CMS hierarchical level.

13. The non-transitory computer readable medium of claim 8 wherein the set of acts further comprises generating a CMS parent hierarchical level at least by mapping a third-party parent hierarchical level to the content object hierarchy, wherein the hierarchy at the third-party system further comprises the third-party parent hierarchical level that is a parent of the third-party hierarchical level according to a parent-child relationship,
- the content object hierarchy at the content management system further comprises the CMS parent hierarchical level that is a parent of the CMS hierarchical level according to the parent-child relationship, and the CMS parent hierarchical level has a CMS parent identifier that is different from a third-party parent identifier of the third-party parent hierarchical level.

14. The non-transitory computer readable medium of claim 8, further comprising instructions which, when stored in memory and executed by the one or more processors causes the one or more processors to perform the set of acts, the set of acts further comprising:
maintaining a plurality of integrations between a plurality of third-party applications and the content management system;
accessing a first integration at a first third-party application to select a second integration associated with a second third-party application; and
invoking, by the second integration, a communication to the second third-party application, wherein the at least one user of the third-party system is a different user than users that collaborate on the plurality of content objects on the content management system.

15. A system for cross-platform collaboration, the system comprising:
a non-transitory storage medium having stored thereon a sequence of instructions; and
one or more processors that execute the sequence of instructions to cause the one or more processors to perform a set of acts, the set of acts comprising,
initiating inter-system sharing between a content management system (CMS) that stores a plurality of content objects and a third-party system;
generating a content object hierarchy comprising a CMS hierarchical level to include at least one of the plurality of content objects at the content management system based on a mapping that correlates the content object hierarchy to a hierarchy at the third-party system, wherein
the hierarchy at the third-party system comprises a third-party hierarchical level,
the third-party hierarchical level at the third-party system corresponds to the CMS hierarchical level at the content management system,
the third-party hierarchical level and the CMS hierarchical level have different identifiers, and
the third-party hierarchical level on the third-party system corresponds to the CMS hierarchical level in that the CMS hierarchical level at the content management system is generated at least by the mapping that maps the third-party hierarchical level at the third-party system to the content object hierarchy at the content management system;
determining an access permission at least by mapping a third-party permission schema on the third-party system to a CMS permission schema on the content management system for at least one user to access the content object hierarchy with the access permission, wherein the CMS schema is equally or more restrictive than the third-party permission schema for accessing the content object hierarchy; and
granting, to at least one user of the third-party system, the access permission to access the at least one of the plurality of content objects in the content object hierarchy at least by generating a graphical user interface window that includes an action user interface element for online interaction with the at least one of the plurality of content objects, based at least in part upon the access permission granted to the at least one user.

16. The system of claim 15, the set of acts further comprising, reconciling between users of the content management system and users of the third-party system at least by comparing attributes of the users of the third-party system with attributes of the users of the content management system.

17. The system of claim 15, the set of acts further comprising mapping access permissions between the content management system and the third-party system based at least in part upon semantics of the CMS schema on the content management system and semantics of the third-party permission schema on the third-party system.

18. The system of claim 17, the set of acts further comprising:
assigning access permissions to content objects of the content management system based at least in part on a result of mapping the access permissions between the content management system and the third-party system; and
generating the graphical user interface window comprises:
incorporating an integration code widget and a user interface element corresponding to the at least one of the plurality of content objects into the graphical user interface window; and
incorporating an action user interface element which, when actuated by the at least one user in the graphical user interface window, raises an event from within the interaction code widget.

19. The system of claim 17, wherein at least one of the access permissions that is granted to a third-party system user to access the content object hierarchy of the content management system is more restrictive than a corresponding access permission that is granted to the third-party system user to access objects of the third-party system, and the content object hierarchy is generated for storing the plurality of content objects in the CMS hierarchical level or in one or more folders in the CMS hierarchical level.

20. The system of claim 15, the set of acts further comprising:
the hierarchy at the third-party system further comprises the third-party parent hierarchical level that is a parent of the third-party hierarchical level according to a parent-child relationship,
the content object hierarchy at the content management system further comprises the CMS parent hierarchical level that is a parent of the CMS hierarchical level according to the parent-child relationship, and
the CMS parent hierarchical level has a CMS parent identifier that is different from a third-party parent identifier of the third-party parent hierarchical level, wherein the at least one user of the third-party system is a different user than users that collaborate on the plurality of content objects on the content management system.

* * * * *